March 19, 1963     S. S. STATA     3,082,032
FLOOR GRATINGS FOR MOTOR VEHICLES
Filed June 27, 1958
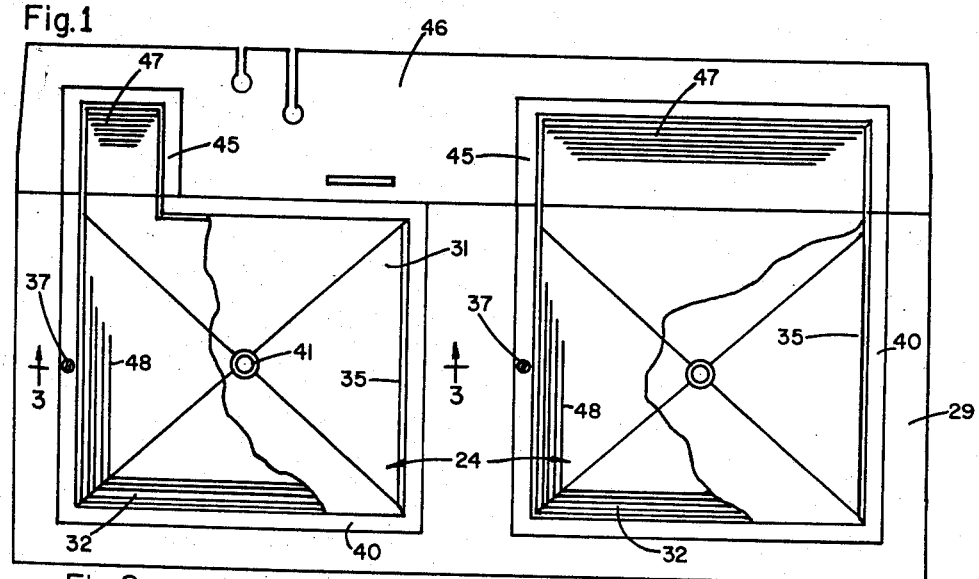
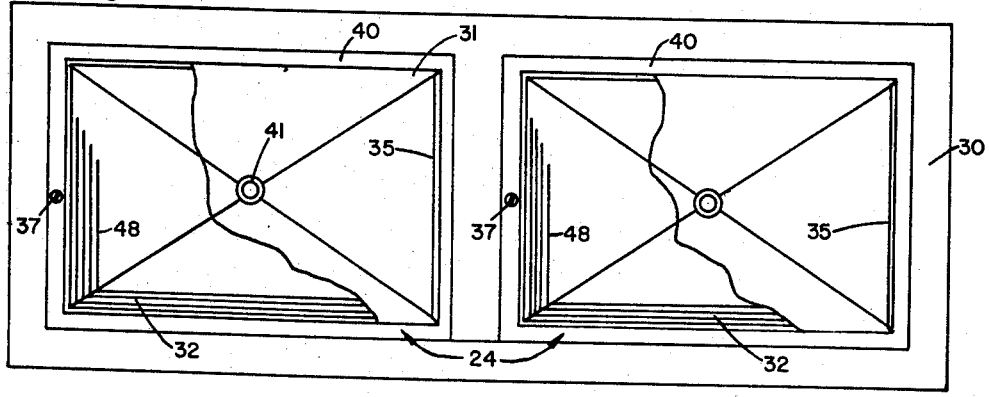
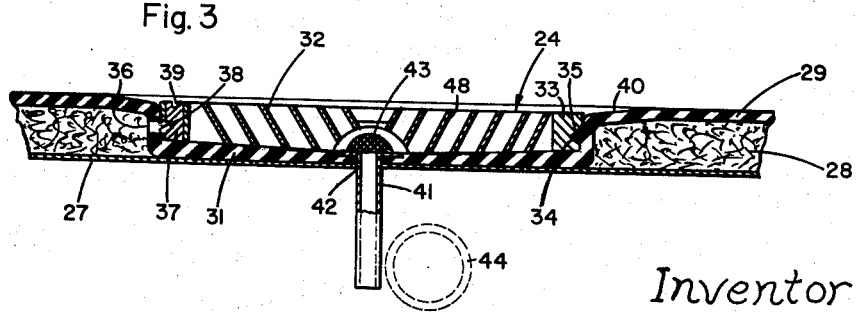
Inventor
Stanley S. Stata
Atty

United States Patent Office 3,082,032
Patented Mar. 19, 1963

3,082,032
FLOOR GRATINGS FOR MOTOR VEHICLES
Stanley S. Stata, 301 Longwood St., Rockford, Ill.
Filed June 27, 1958, Ser. No. 744,974
8 Claims. (Cl. 296—1)

This invention relates to floor gratings for motor vehicles designed to remedy a fault in modern car construction apparently never realized before and keep floor coverings dry and clean under all weather conditions and eliminate the danger of carpets rotting from wetting and metal floors becoming badly rusted even to the point of weakness and liability of breakage. Safer driving in winter is also assured with such gratings because snow and ice can be scraped off the shoes before they can cause slippage on the pedals. The gratings also afford a recess in each receptacle under each grating where dirt can be swept and kept until it is convenient to clear it out upon removal of the gratings, the gratings when properly designed and installed also improving the appearance of the vehicle's interior.

In accordance with my invention, one or more grating panels are provided, each disposed in a shallow pan molded as an integral depressed part of a rubber floor mat resting on the usual felt deadener except where the bottom of the pan portion rests on the metal floor and has a flanged drain pipe entered in a drain hole, one side of the grating panel being recessed to receive a projection on that side of the pan portion to retain the grating, and suitable means being provided on the other side of said panel to secure it in place in the pan portion.

In case the drain pipes used are fairly small in diameter, I may provide screens at their inlet ends to prevent entry of any small pebbles or other solids that could cause clogging. If these pipes are of larger diameter, the strainers can most likely be omitted.

The gratings in the front seat compartment preferably include in addition to the horizontal gratings directly in front of the seat, forward extensions covering appreciable areas of the toe-board, these extensions including pans under the gratings draining into the horizontal pans under the horizontal gratings.

In each form, I prefer to provide an inwardly inclined surface around the top of each pan or depression to drain any moisture in the vicinity off the carpet.

The invention is illustrated in the accompanying drawing, in which:

FIG. 1 is a plan view of a front floor mat provided with grating panel recesses in accordance with my invention, portions of the grating panels being broken away;

FIG. 2 is a similar view of a rear floor mat of similar construction, and

FIG. 3 is a cross-section on line 3—3 of FIG. 1, showing in dotted lines the relationship of the drain pipe to an engine exhaust pipe.

The same reference numerals are applied to corresponding parts throughout these views.

Referring to the drawing, the reference numeral 24 designates the four floor gratings provided in accordance with my invention, two in front of the front seat and two behind it. The sheet metal floor, a portion of which is indicated at 27, is usually sound-proofed and insulated by a covering of felt or jute 28, and a carpet or other floor covering is laid over that. In lieu of the carpet and insulation material under it, I provide a mat 29 molded of rubber or plastic material for use in front of the front seat and a somewhat similar mat 30 for use behind the front seat, both mats having generally rectangular pans 31 molded integral therewith to receive the metallic grating panels 32. The lower priced cars are usually equipped with rubber floor mats, and an owner of such a car could readily replace the existing mats with mats 29 and 30 shown in FIGS. 1 and 2, respectively. The depressed pan portions 31 rest directly on the metal floor 27, and the usual felt or jute sound deadening pad 28 is disposed between the floor 27 and the rest of the mat as clearly appears in FIG. 3. Each panel 32 comprises a rectangular frame 33 having a longitudinally extending groove 34 provided in one side thereof in which a V-shaped projection 35 molded integral with the adjacent side wall of the pan 31 is received to retain the panel. A horizontal slot 36 is provided in the opposite side wall of the pan 31 and a pin 37 is rotatably mounted in the frame 35 on that side adjacent the slot 36 and has a radially extending latch bolt 38 extensible from the frame 33 into the slot 36 for detachably securing the panel in place, this being done by turning pin 37 through approximately 90° by means of a screw driver entered in slot 39 to lock or unlock the panel 32. There is good drainage from the mat into all four sides of each depression 32 by virtue of the clearly defined funnel formation 40 around the top of each pan on the mat. The drain pipe 41 mounted in the center of the bottom of the pan 31 and extending through a hole 42 provided in the floor 27 has its upper end at the lowest level in the pan, as indicated by the section FIG. 3 and by the radial lines in FIGS. 1 and 2, and a strainer 43 is preferably provided over the inlet end of this drain pipe to exclude small pebbles and other solids that might cause clogging of the drain pipe, the latter being preferably located close to one of the engine exhaust pipes 44 to prevent freezing of water in the drain pipe in cold weather. The gratings 24 for the front pad 29 have the toe-board extensions indicated at 45 in the upwardly inclined toe-board portion 46, and the grating panels 47 in these extensions may be extensions of the panels 32 but are preferably separate panels separately detachably secured in place similarly as panels 32, as shown in FIG. 3.

Obviously, the driver or passenger in winter can upon entering a motor vehicle equipped with these floor gratings 24 immediately scrape off any snow or ice from his shoes on the foot-scraper surfaces 48 instead of messing up the carpet, and in a short time the warmth in the car causes the snow or ice to melt and the water drains out. The close proximity of the hot exhaust pipe 44 is enough to prevent clogging of the drain pipe 41 by freezing of moisture therein. In warm weather, dirt and water can be scraped off into these floor gratings to keep the car interior clean, and, at intervals, the little dirt that may still be collected on the carpet can be swept into these gratings, and whenever the car is washed and the car interior is cleaned, the grating panels 32 and 47 can be removed and the pans 31 cleaned out and the panels also cleared of any dirt that might be left adhering thereto.

It is believed the foregoing description conveys a good understanding of the objects and advantages of my invention. The appended claims have been drawn to cover all legitimate modifications and adaptations.

I claim:

1. In a floor grating construction for vehicles, a substantially horizontal floor supporting a laminated floor covering which comprises a flexible top layer of molded plastic material, and a bottom layer of cushioning and sound deadening and insulating material that rests on the floor and resiliently supports the top layer, one or more shallow pans for gratings molded integral with the top layer and resting directly on the floor and defining depressions in said floor covering at one or more of the driver's and passenger's locations, said pans having drain openings provided therein communicating with drain pipes extending downwardly through openings provided therefor in the floor, and foot scraper grating panels removably disposed in said pans.

2. A floor grating construction as set forth in claim 1 wherein the top layer is molded so as to define fairly wide inwardly inclined surfaces around the top of each pan depression, whereby to drain off moisture in the vicinity of a pan depression from the floor covering into said depression.

3. In a motor vehicle having a floor with a small opening provided therein, a mat covering the floor, a shallow pan the top of which is substantially flush with the top surface of the mat, so that dirt can be swept off the mat into the pan conveniently, said pan having a drain opening communicating with the floor opening, so that moisture entering the pan will drain out below the floor, and a foot scraper grating panel removably disposed in said pan substantially flush with the top thereof, whereby dirt, water, snow and ice may be scraped off into the pan.

4. A structure as set forth in claim 3 including means for detachably securing said grating panel in place in said pan and detachably securing the pan in fixed relationship to the floor and opening therein.

5. A structure as set forth in claim 3 including a drain pipe extending downwardly from the drain opening and disposed in heat exchange proximity to an engine exhaust pipe.

6. A structure as set forth in claim 3 including a strainer preventing entry of pebbles or solid particles into said drain opening to prevent clogging thereof.

7. A structure for a motor vehicle as set forth in claim 3 wherein the top surface of the mat around the pan, of an appreciable width, is inwardly inclined toward the pan, whereby to drain off moisture from the mat in the vicinity of the pan into said pan.

8. In a floor grating construction for vehicles, a substantially horizontal floor supporting a laminated floor covering which comprises a flexible top layer of molded plastic material, and a bottom layer of cushioning and sound deadening and insulating material that rests on the floor and resiliently supports the top layer, one or more shallow pans for gratings in flush water-tight relationship with the top layer and resting directly on the floor and defining depressions in said floor covering at one or more of the driver's and passenger's locations, said pans having drain openings provided in the bottom thereof communicating with openings provided in the floor, and foot scaper grating panels removably disposed in said pans.

References Cited in the file of this patent

UNITED STATES PATENTS

| | | |
|---|---|---|
| 543,999 | Morton | Aug. 6, 1895 |
| 1,684,613 | Woller | Sept. 18, 1928 |
| 1,698,005 | Stanwood | Jan. 8, 1929 |
| 2,258,238 | Collins | Oct. 7, 1941 |
| 2,312,812 | Geyer | Mar. 2, 1943 |
| 2,650,855 | Peirce | Sept. 1, 1953 |

FOREIGN PATENTS

| | | |
|---|---|---|
| 1,130,448 | France | Sept. 24, 1956 |
| 199,510 | Great Britain | Apr. 1, 1922 |